Fig. 3.

June 23, 1953 F. M. CARROLL 2,642,787
RECORD CARD COUNTING, STACKING, AND CONVEYING MECHANISM
Original Filed May 12, 1949 8 Sheets-Sheet 4

Fig. 4.

INVENTOR
FRED M. CARROLL
BY Robert S. Dunham
ATTORNEY

Fig. 5.

June 23, 1953  F. M. CARROLL  2,642,787
RECORD CARD COUNTING, STACKING, AND CONVEYING MECHANISM
Original Filed May 12, 1949  8 Sheets-Sheet 6

Fig. 6.

INVENTOR
FRED M. CARROLL
BY Robert S. Dunham
ATTORNEY

June 23, 1953 F. M. CARROLL 2,642,787
RECORD CARD COUNTING, STACKING, AND CONVEYING MECHANISM
Original Filed May 12, 1949 8 Sheets-Sheet 7

Fig. 7.

INVENTOR
FRED M. CARROLL
BY *Robert S. Dunham*
ATTORNEY

June 23, 1953 F. M. CARROLL 2,642,787
RECORD CARD COUNTING, STACKING, AND CONVEYING MECHANISM
Original Filed May 12, 1949 8 Sheets-Sheet 8

INVENTOR
FRED M. CARROLL
BY Robert S. Dunham
ATTORNEY

Patented June 23, 1953

2,642,787

UNITED STATES PATENT OFFICE 2,642,787

RECORD CARD COUNTING, STACKING, AND CONVEYING MECHANISM

Fred M. Carroll, Binghamton, N. Y., assignor to International Business Machines Corporation, New York, N. Y., a corporation of New York Original application May 12, 1949, Serial No. 92,822. Divided and this application February 16, 1951, Serial No. 211,416

3 Claims. (Cl. 93—93)

This invention relates to a machine for processing record cards. More particularly, the aspects of the machine to which this application is directed comprise card counting, stacking and conveying mechanism, this application being a division of Fred M. Carroll application, Serial No. 92,822, filed May 12, 1949.

In general, the machine disclosed in the aforesaid application includes a punching unit, with which is associated a recorder. Spaced from the punching unit is a printing device, which includes indexible printing wheels, together with means for indexing the printing wheels, whereby serial numbers may be imprinted on a record card. A card conveyor is provided for advancing cards from a card magazine in step-by-step relation to the punching unit and to the printing device. Finally, the mechanism shown in that application and to which the present application is particularly directed provides for counting, stacking and transporting record cards that have been processed in the machine.

It is, therefore, an object of the present invention to provide improved means for counting cards that have been processed and for arranging such cards in stacks of predetermined numbers.

It is a further object of the invention to provide card controlled mechanism for rendering inoperative the card counter if for any reason the printing section of the machine fails to deliver therefrom a record card.

It is still a further object of the invention to provide improved card counting and stacking mechanism, which is operatively associated with a take-off conveyor for removing stacks of processed cards of predetermined numbers from the operative orbit of the machine.

Other objects and advantages of the invention will become apparent upon reading the following specification in light of the drawings forming a part of this application, and in which drawings.

Figure 2:
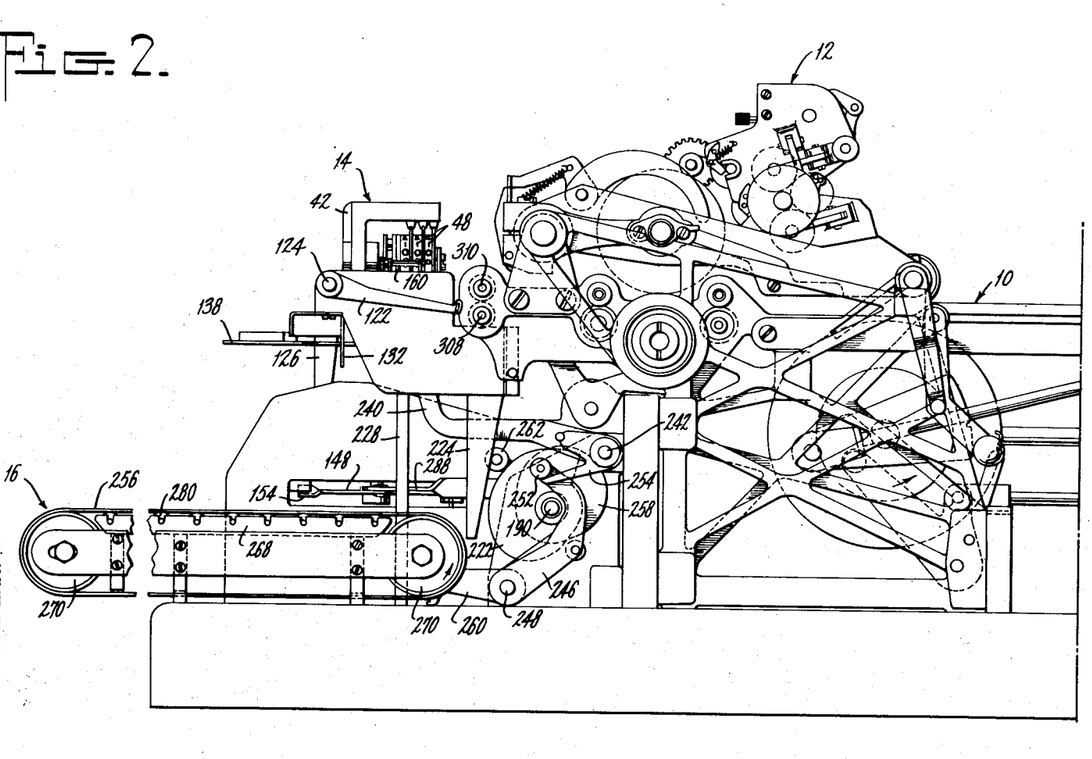
Fig. 2 is a side elevational view of the mechanism shown in Fig. 1.

Record cards discharged from the card punching unit of the aforesaid Carroll application are advanced in step-by-step relation along a conveyor 10 at the end of which they enter a printing mechanism 12, wherein serial numbers are printed on the cards. From the printing mechanism 12, the cards advance through a card counting mechanism 14 (Fig. 2) at which point the cards are stacked in groups of predetermined numbers, after which they are further handled by conveying mechanism 16, which is effective to remove the counted stacks of cards from the operating orbit of the machine. The present application is concerned with the card counting mechanism 14, the card conveying mechanism 16, and the necessary control instrumentalities which permit these features of the machine to operate synchronously with the passage of cards through the various processing stations.

Figure 1:
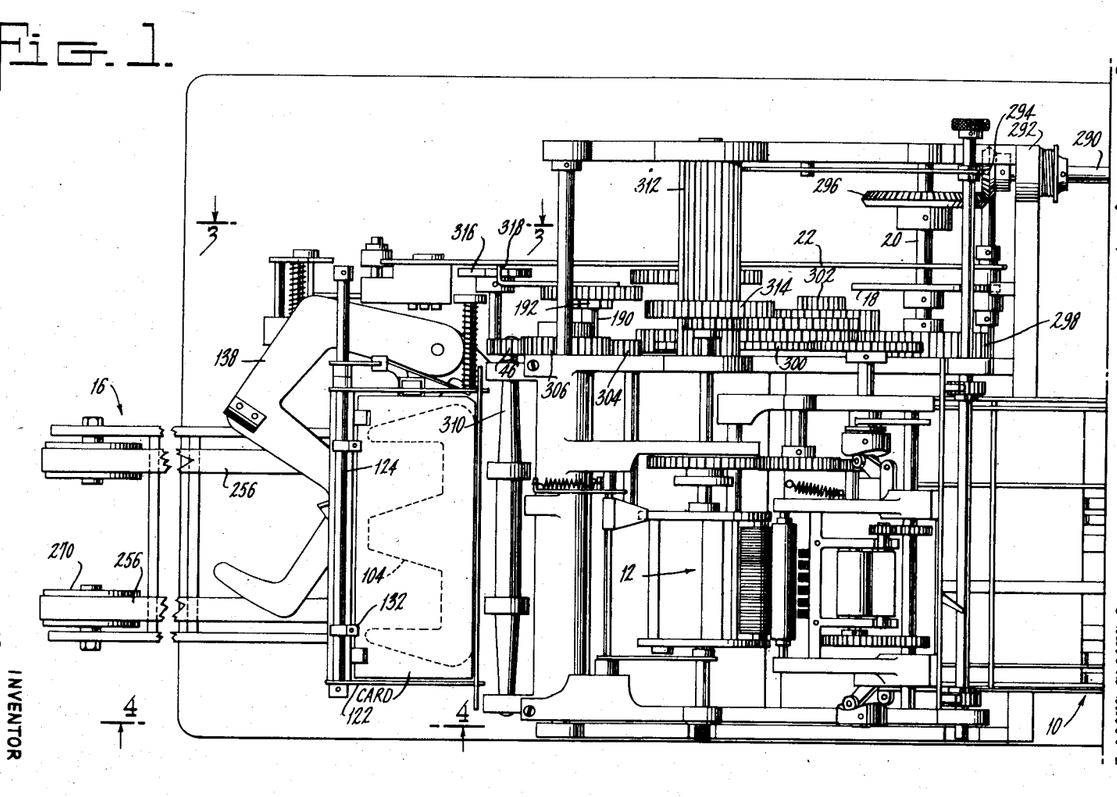
Fig. 1 is a plan view of the card counting, stacking and conveying mechanism.

Mechanism for sensing the regular and progressive progress of cards through the machine is under the control of a cam 18 mounted for rotation with the cam shaft 20 (Fig. 1). The cam 18 controls the motion of a forwardly extending crank shaft 22. The forward end of the crank shaft 22 is pivoted on a plate 24 (Fig. 3), which is mounted for rocking movement on a stud shaft 26. A rearwardly extending arm 28 of the plate 24 is in contact with a depending cam lever 30, the lever being pivoted for rocking movement on a pin 32. The depending cam lever 30 has a rearwardly projecting ear 34, which provides a support for a lever 36. When the cam 18 is rotating, the operating shaft 22 will be reciprocated and consequently rock the plate 24 about its stud shaft mounting 26. As the plate 24 is rocked in a clockwise direction, the rearwardly projecting arm 28 moves along the cam surface of the depending lever 30. The ear 34 is held without substantial movement until the cam follower 28 reaches an area 38 in the depending cam lever. At this time the cam lever will rock in a counterclockwise direction, with the result that the support of the ear 34 will be withdrawn from the lever 36. At such time the lever 36 will be rotated in a clockwise direction under the influence of a spring 40 unless a card is at the printing station in overlying relation to a card sensing rod, as fully described in the parent application. In case no card is present, the before-described sequence of operations inhibiting the advance of the numbering wheels takes place. The foregoing mechanism is more fully described in the Fred M. Carroll application mentioned in the first paragraph hereinabove. Since the control mechanism which is responsive to the presence or the absence of a record card forms no important part of the present application, a more detailed description is deemed unnecessary.

There is included herein a card counting mechanism, which is under the control of the rocking plate 24. Mounted on an upstanding frame part 42 (Fig. 3) at a point to the rear of a pair of feed rollers 44 and 46 are a plurality of number wheels 48. These wheels are adapted to be rotated about a shaft 50 for counting the cards that have been processed at the punching and printing stations. The shaft 50 also supports a yoke 52, with which is assembled a number wheel detent 54, which is effective upon rocking movement of the yoke 52 to engage and rotate the number wheels in step-by-step relation and to transfer rotary motion between wheels for transferring values of lower order to each successive higher order. The counter is of conventional structure and a detailed description thereof is deemed unnecessary. It is sufficient herein to describe how the counter is specifically combined with the machine for performing its intended function. The yoke 52 includes a laterally projecting arm 56, in which is fixed a pin 58 and to which is pivotally mounted an operating bar 60. The pin 58 constitutes an anchor for one end of a spring 62, the spring having its other end fixed to an anchor stud 64. It is manifest, therefore, that the spring 62 tends to rotate the arm 56 and its associated yoke 52 in a counterclockwise direction, which is effective to position the number wheel detent 54 for rotation of an associated numbering wheel or number wheels on the return stroke of the operating bar 60. Reference will now be made to the manner in which the operating bar 60 is actuated.

A linkage system (Fig. 3) is disposed between and connects the plate 24 and the operating bar 60, whereby movement of the plate is transmitted to the operating bar. Herein the linkage system is illustrated as consisting of a lever 66, which has one end thereof pivoted to the plate 24 by means of a pivot pin 68. The upper end of the lever 66 is pivoted to an angularly disposed link 70 by means of a pivot pin 72. The link 70 is mounted on a frame stud 74 for rocking movement thereon. The link 70 includes a lip 76, which projects rearwardly beyond the pivot point 72, constituting an actuating member. The actuating lip 76 is adapted to engage a shoulder 78, which is formed in one edge of the operating bar 60. Engagement between the actuating lip 76 and the shoulder 78 is normally established when the bar 60 hangs in a normally vertical position. It will be shown hereinafter that means has been provided for moving the bar out of its normal vertical position to disable the counting mechanism upon failure of regular passage of a card through the printing station.

Figure 3:
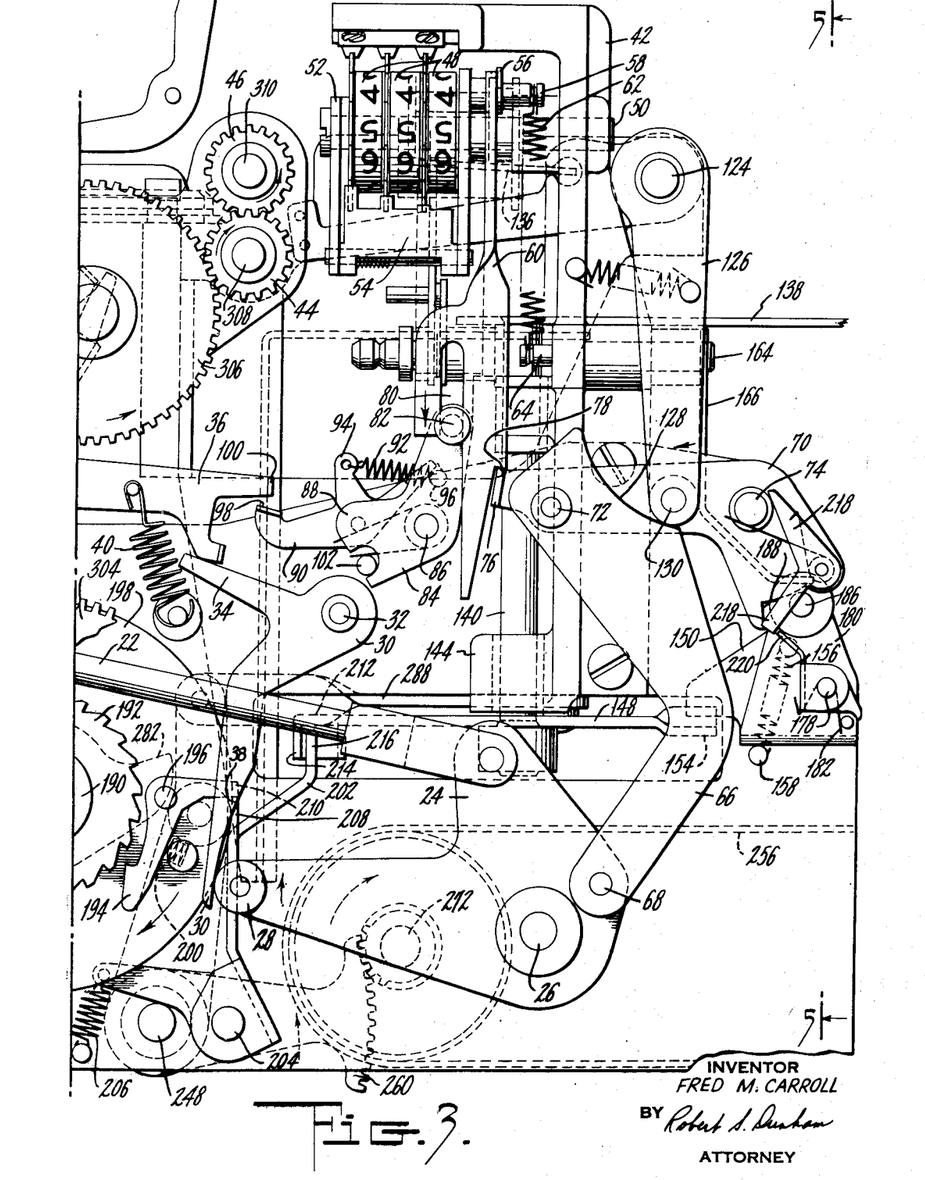
Fig. 3 is a view on line 3—3 of Fig. 1.

When the link 70 is rocked in a counterclockwise direction and the actuating lip 76 thereof engages the shoulder 78 of the operating bar 60, the operating bar 60 moves upwardly and rocks the yoke 52 on an operative stroke against the tension of the spring 62. This is the manner in which the number wheels 48 are advanced in step-by-step fashion to count the cards passing through the printing station. In order that a safeguard be provided against the possibility of operating the number wheels 48 upon failure of regular passage of a card through the printing station, there is provided a control mechanism responsive to the operation of the card controlled lever 36. The counter bar 60 has a guide slot 80 in which operates a slot follower 82, which is carried on one arm of a plate 84 pivoted for rocking movement on a frame stud 86. Pivoted to an angularly disposed extension 88 of the plate 84 is a contact finger 90. The contact finger 90 is urged in a clockwise direction by a spring 92, which has one end thereof anchored in an upwardly extending ear 94 formed as a part of the contact finger 90 and the other end thereof in an anchor stud 96, which extends outwardly from the rear face of the plate 84. As a result, the contact finger 90 is normally held in an elevated position. The number wheel bar 60 is mounted on the arm 56 with sufficient clearance to permit the bar to rock slightly in a vertical plane. The rocking movement permitted is sufficient to withdraw the shoulder 78 from the operating zone of the flange 76. Depression of the contact finger 90 and the resultant rocking of the plate 84 is effective to swing the operating bar 60 for the purpose of moving the shoulder 78 out of the operative zone of the plate 76. In order that the number wheel bar may be rocked in this manner, the contact finger 90 has provided at the free end thereof a face 98, which underlies an extension 100 of the card controlled lever 36. The face 98 and the extension 100 are spaced from each other sufficiently that the normal limited rocking of the lever 36 is ineffective to rock the contact finger 90 and the number wheel bar 60 ultimately controlled thereby. However, upon full movement of the lever 36, which occurs only when a card is absent at the card sensing station, the extension 100 abuts the face 98 and rocks the lever 84 about its pivot 86 to its limit position against a stud 102. Release of the contact finger 90 permits the number wheel operating bar 60 to return to its normal position, where it remains in operative relation with its drive mechanism until the absence of another card is detected.

Figure 4:
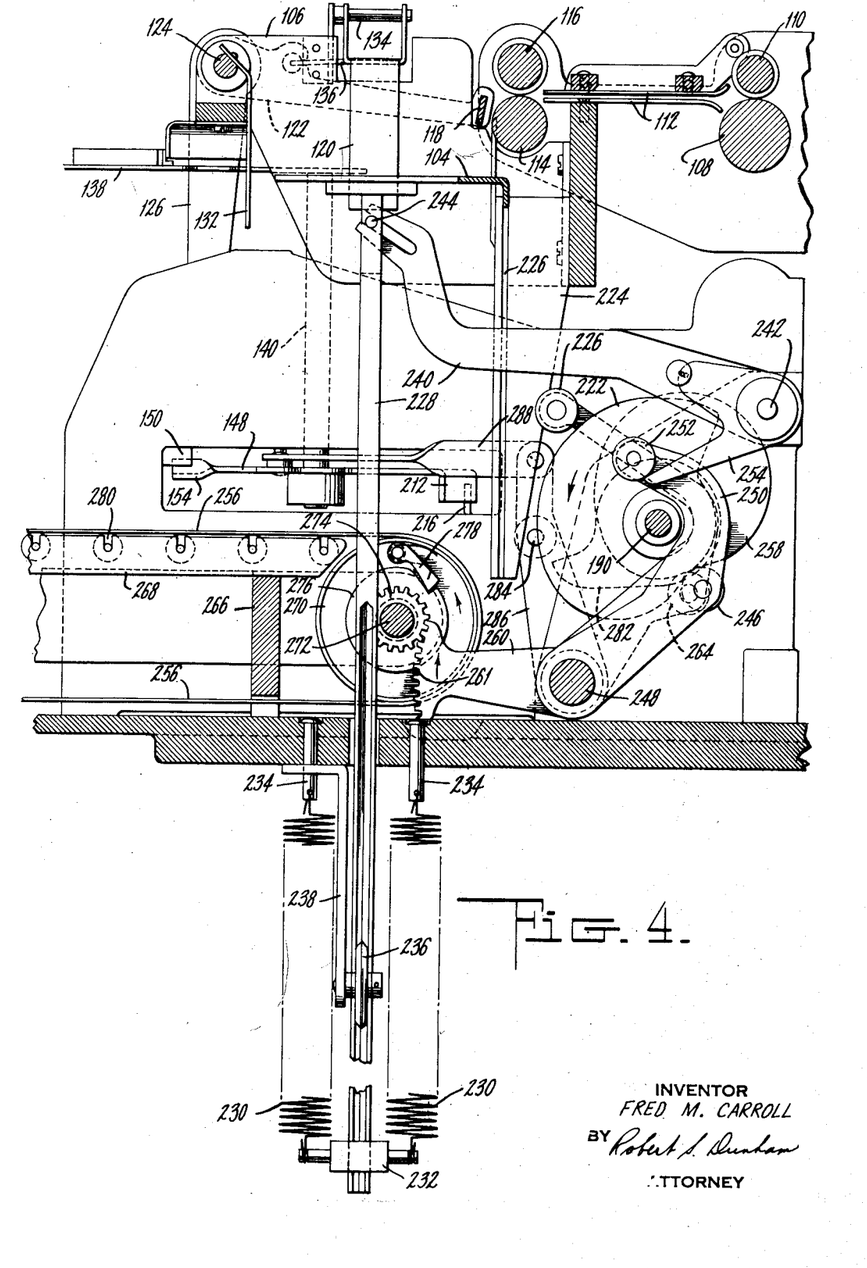
Fig. 4 is a longitudinal, sectional view taken on line 4—4 of Fig. 1.
Figure 7:
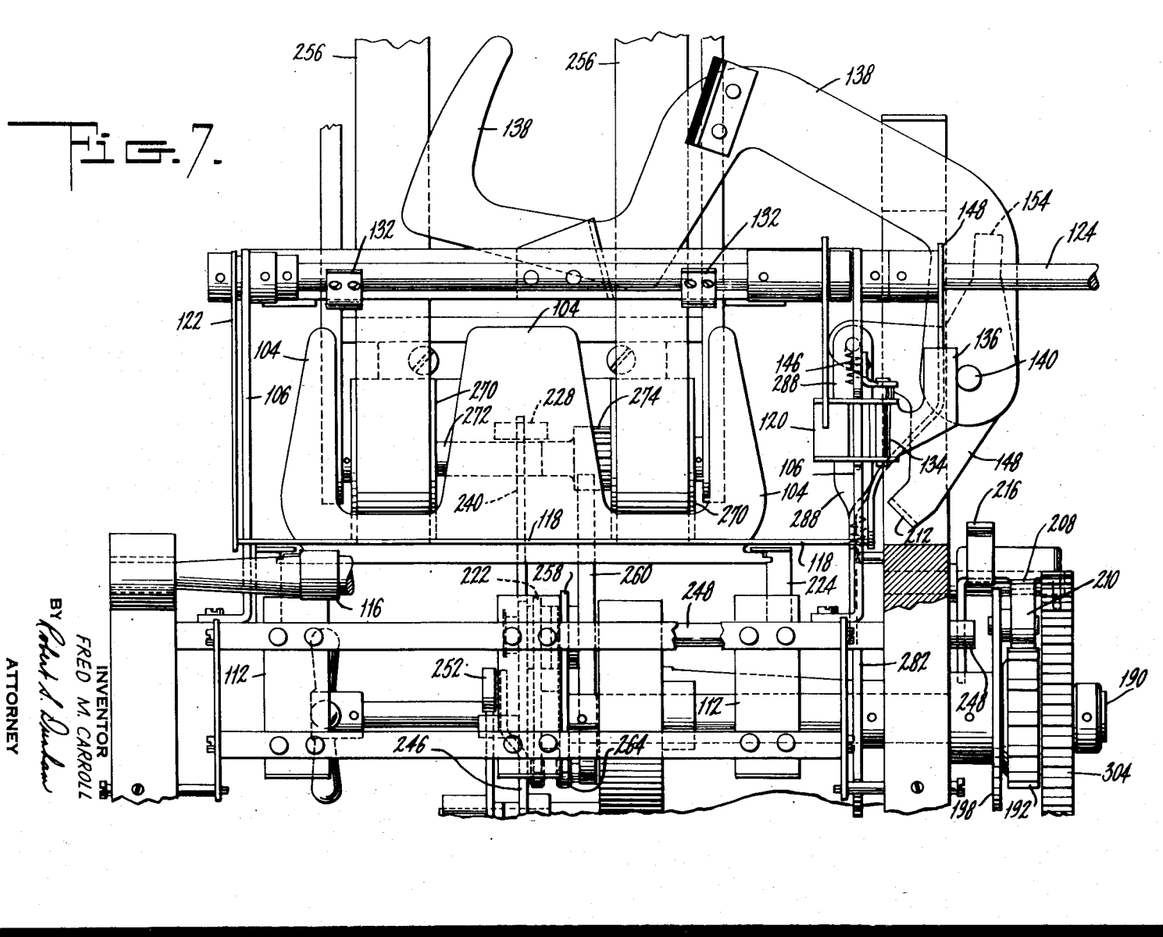
Fig. 7 is a detail plan view of card stacking and handling mechanism.

As cards are discharged from the printing station, they are delivered to an elevator 104 constituting the bottom of a card receiver or rack 106 (Figs. 1, 4 and 7). The cards pass from the platen of the printing mechanism through a first set of rear feed rollers 108 and 110 and through a card guide grid 112, from where they are discharged by a second set of rear feed rollers 114 and 116 into the card rack 106. In order that the cards accumulating in the card rack 106 may be evenly stacked, there is provided in conjunction with the card rack 106 card evening devices 118 and 120. Device 118 consists of a transverse bar, which is adapted to move up and down at the discharge side of the feed rollers 114 and 116 to assure that the trailing end of a card passes into the rack 106. The bar 118 is affixed at its ends to the ends of levers 122 keyed to an oscillating transverse shaft 124. One end of shaft 124 has attached thereto a card aligner operating arm 126. The arm 126 extends downwardly into the operative orbit of the lever 66 (Fig. 3). The lever 66 has formed therein a cam face 128, against which rests a follower 130 carried at the end of the lever 126. As the lever 66 is rocked, shaft 124 will be oscillated, with the result that the card aligning bar 118 is operated. Attached to the transverse shafts 124 are a plurality of aligning fingers 132, which rock with the shaft to align the card in a transverse direction. The aligning lever 120 is mounted to swing on a supporting pin 134, and such swinging movement is achieved by an actuator 136 mounted on the lever 122 and extending into engagement with the mounting bracket of the lever 120, whereby the aligning member 120 is oscillated back and forth with periodic regularity.

The cards issuing from the feed rollers 114 and 116 are stacked in groups of predetermined numbers on the elevator platform 104, and stacking of such cards is under the control of the number wheel assembly 48. As will appear from the following description, a shutter 138 (Figs. 1, 6 and 7) is supported on the upper end of a shutter shaft 140, the shaft being supported for oscillating movement in suitable frame bearings 142 and 144. The shutter is swung in a counterclockwise direction under the influence of a spring 146, so that its normal position is over the cards on the card elevator platform. During the stacking of cards on the elevator platform, the shutter 138 is latched in a retracted position. The shutter shaft 140 is rocked in a clockwise direction to retract the shutter, and the shaft is latched in such retracted position by means of a latched lever 148 fixed to the lower end of the shutter shaft. The latch lever 148 is adapted to engage behind a flange 150, which projects into the path of the latch lever, and which is pivoted on a stud 152 (Fig. 5) for rocking movement thereabout. It will be noted that the end 154 of the latch lever 148 is twisted to provide a cam surface, whereby movement of the twisted end of the lever through the normal plane of the latch flange 150 will turn the flange about its pivot 152 as the latch lever passes. When the lever passes beyond the latch flange, the flange is retracted into latching position behind the lever by means of a spring 156. A stud 158 limits the downward movement of the latch flange 150.

Figure 5:
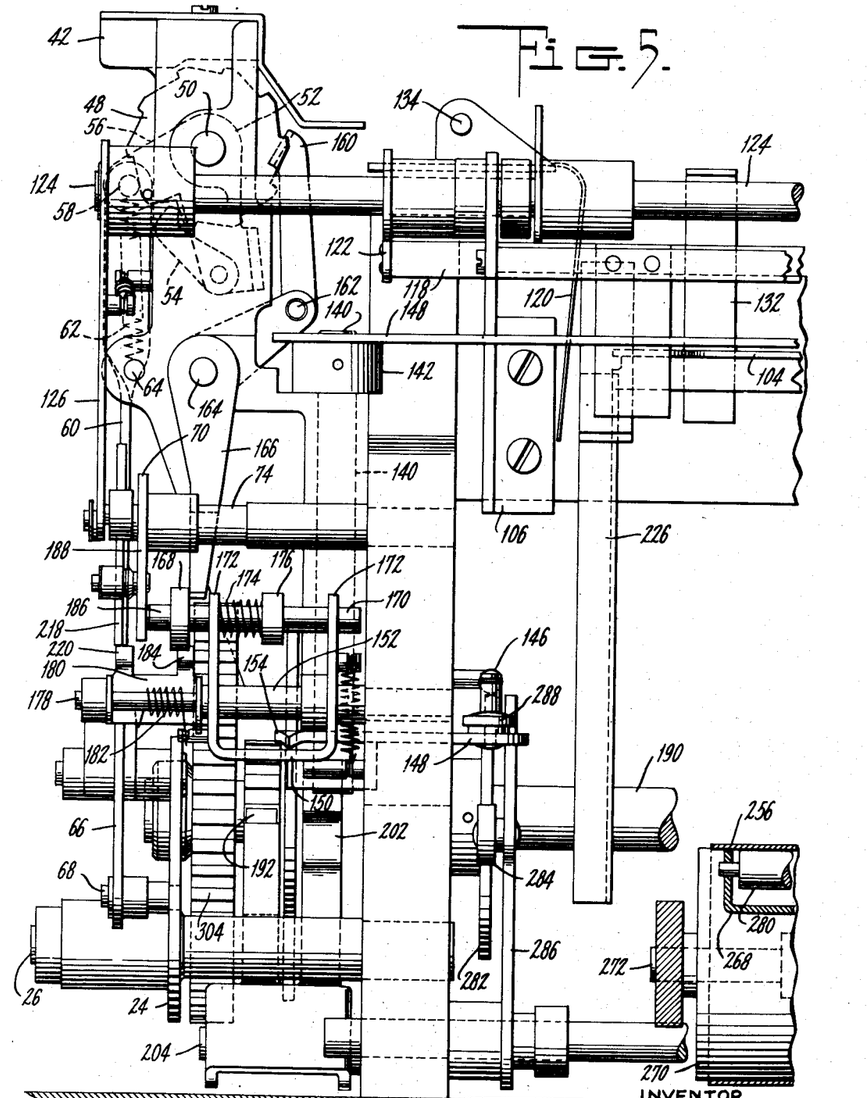
Fig. 5 is a detail view on line 5—5 of Fig. 3.
Figure 6:
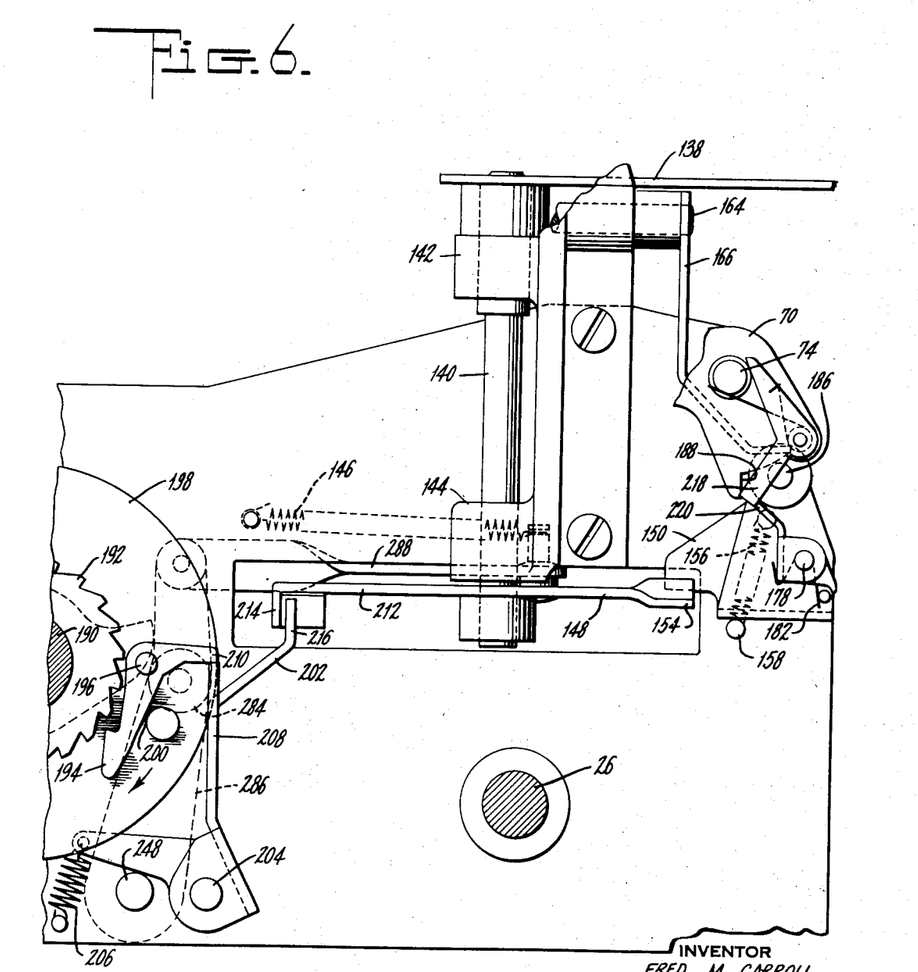
Fig. 6 is a detail view taken at right angles to Fig. 5 and having overlying parts thereof removed to show underlying structure.

The latch 150 is under the control of a counter actuated release linkage, best illustrated in Figs. 3 and 5 of the drawings. The number wheels 48 are recessed between the number thereon for the purpose of selectively receiving a release pin adapted to extend outwardly in a radial direction. A release lever 160 is positioned adjacent the number wheels 48, the same being mounted for axial adjustment and rocking movement on a shaft 162. Because of the axial adjustability of the release lever 160, it is possible to position the lever with reference to any selected one of the number wheels, in order to bring the free end of the release lever into the path of a prepositioned release pin. Thus, when a release pin comes into contact with the free end of the release lever 160, the lever is rocked thereby in a clockwise direction and the motion thereof is transmitted to a shaft 164, on which is secured a shift lever 166, the lower end of which is in contact with a collar 168 carried by a sliding rod 170 mounted in the spaced flanges 172 of the latch 150.

The sliding rod 170 is normally urged to the right in Fig. 5 by means of a spring 174, which is coiled about the rod and bears at its one end against the flange 172 and at its other end against a collar 176 that is fixed to the rod. In order to temporarily maintain the sliding rod in its shifted or left-hand position, there is provided on the shaft 178 of the latch flange 170 a rod latching device 180. The rod latch 180 is urged about its supporting shaft in a clockwise direction by means of a spring 182, so that the tendency of the rod latch is to move in that direction unless restrained from doing so. Herein the collar 168 constitutes the rod latch restraint. The collar lies in contact with an ear 184 of the latch and holds it in a depressed position against the tension of the spring. When, however, the shift lever 166 moves the rod 170 to its left-hand position, the latch ear 184 springs upwardly behind the collar 168 and prevents movement of the collar toward the right until the rod latch 180 has been restored to its original position.

When the sliding rod 182 has been moved into the left-hand position, a projecting end 186 thereof will lie in the path of a shoulder 188 formed in the adjacent surface of the link 70. Upon rocking motion of the link 70, the shoulder 188 will abut the extending end 186 of the latch rod and will rock the latch on its pivot 152, thereby withdrawing the flange thereof out of contact with the end 154 of the latch lever 148. This release sets in motion the card shutter and clutches the cam shaft 190 (Fig. 3) for rotation, as will appear more directly from the following.

The cam shaft 190 has thereon a one-revolution clutch 192, which is adapted to be clutched into operative relation with the cam shaft by means of a pawl 194, which is pivoted by means of a pivot pin 196 to a clutch plate 198. The clutch plate 198 in turn is fixed to the rear cam shaft 190, and thereby rotation is transmitted to the shaft when the clutch device is in operation. The pawl 194 is normally urged toward the teeth of the clutch 192 by a spring 200, and such spring is effective for its purpose upon release of a clutch latch 202. The clutch latch is pivoted for rocking movement on a pivot shaft 204, and the same is urged toward the clutch mechanism by means of a spring 206. The clutch latch 202 includes an abutment surface 208 adapted to lie in the path of a rearwardly extending arm 210 of the pawl 194. As a consequence, the clutch latch is effective to swing the clutch pawl into inoperative position when the rearwardly extending arm 210 abuts the abutment surface 208 of the latch structure. Rotary movement of the clutch plate and of the rear cam shaft is impossible thereafter until the clutch latch is withdrawn to permit the pawl to move into contact with the clutch teeth for another revolution of the clutch plate and cam shaft.

The withdrawal of the clutch latch 202 is accomplished by the opposite end 212 of the latch lever 148 mounted on the lower end of the shutter shaft. The latch lever 148 has a downwardly turned flange 214, which is angularly disposed on the end of the lever to constitute a cam surface. The downwardly turned flange of the lever 148 is adapted to operate a rearwardly upturned part 216 of the clutch latch 202. It will appear, therefore, that upon release of the latch lever 148, the shutter 138 is immediately carried into the card rack 106 in overlying position with reference to cards that may have been deposited on the elevator platform 104. Further deposit of cards on such pile is, therefore, prevented. A further result of operation of the latch lever 148 is the release of the pawl 194 from the restraint of the clutch latch 202, thereby permitting the spring 200 to project the pawl 194 into contact with the clutch teeth 192. Thereby the clutch plate 198 and the rear cam shaft 190 are placed under rotation.

Since the lever 70 is swinging upon its pivot 74 without effect on the sliding rod 170 (Fig. 5), the next operation in point of time is the restoration of the sliding rod 170 to its original right-hand position, thereby restoring the latching mechanism for again latching the latch lever 148 at a later point in the cycle. The rod 170 is restored under the influence of the restoring spring 174 upon withdrawal of the flange finger 184 from behind the collar 168. Such withdrawal is accomplished when a restoring pawl 218 moves into contact with an ear 220 of the rod latch. Such restoration takes place upon the next succeeding operation of the link 70. As the link rocks in a clockwise direction, the restoring pawl 218 moves into contact with the ear 220 and moves the whole rod latch 180 in a counter-clockwise direction against the influence of the spring 182. As soon as the finger 184 has been withdrawn from behind the collar 168, the rod 170 moves to the right under the influence of the spring 174 and the whole latching mechanism is, therefore, reconditioned.

Figure 8:
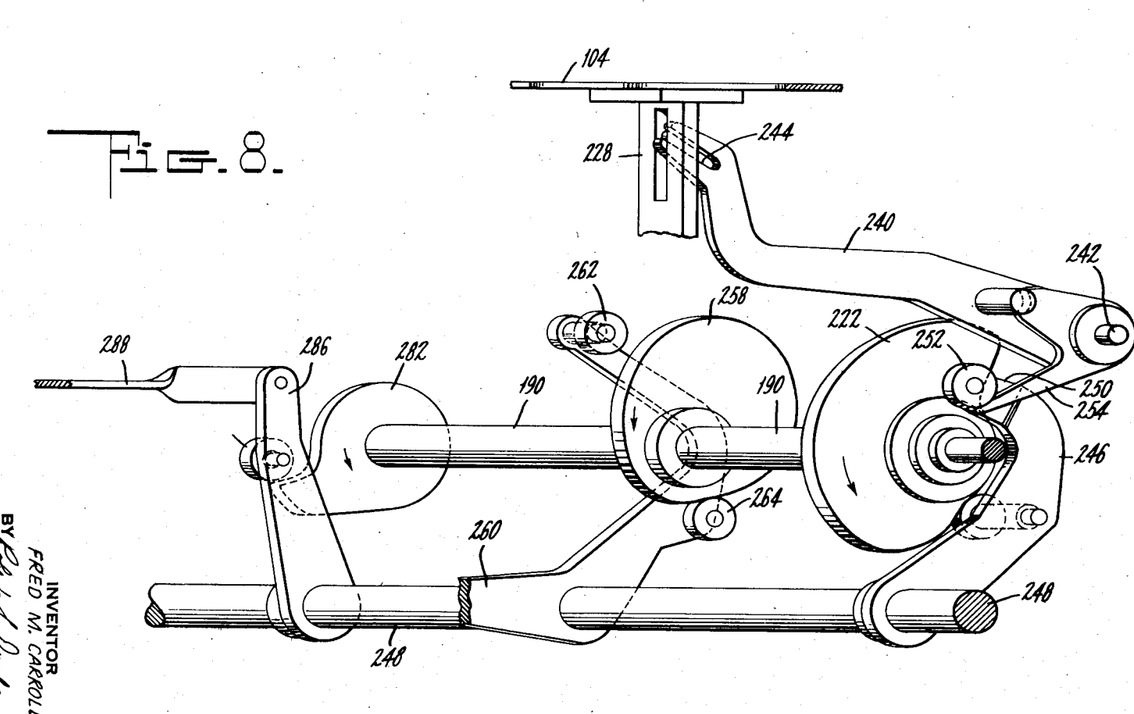
Fig. 8 is a perspective view showing card handling mechanism control cam arrangements.

When the cam shaft 190 is rotated, an elevator cam 222 (Figs. 4 and 8) first becomes effective to lower the elevator 104 into the operative zone of a conveyor mechanism. The elevator 104 is guided in its reciprocatory movement by a pair of oppositely disposed guide members 224, which include a groove 226, into which laterally extending flanges of the elevator extend. The elevator is supported on a shaft 228 which extends through the base of the machine, and which is supported in its lower end by a pair of springs 230 anchored at one end to a shaft bracket 232 and at the other end to anchor studs 234. The elevator shaft 228 is guided for movement by a pair of oppositely disposed guide rollers 236 supported on the free end of a guide bracket 238. It follows, therefore, that the elevator 104 is spring loaded and the same may yield under the weight of cards disposed thereon. Operative means has, moreover, been provided for actuating the elevator 104, and such means is operative in conjunction with the elevator cam 222 (Fig. 8).

A cam arm 240 is pivoted for movement about a supporting shaft 242, and the free end thereof is attached to the elevator shaft 228 by means of a pin and slot connection 244. Movement of the elevator cam arm 240 is under the control of the elevator cam 222 through the interposition of an elevator cam following arm 246. The elevator cam following arm 246 is mounted for rocking movement about a bearing shaft 248, and the arm includes an upwardly extending portion 250, which carries a follower roller 252, and which roller lies in contact with a cam finger 254 of the cam arm 240. The elevator cam 222 is first effective to depress the cam arm 240 sufficiently to place the platform 104 under the plane of a pair of conveyor belts 256 (Fig. 4), and the contour of the elevator cam assembly is such as to hold the elevator in its depressed or discharge position until the conveyor structure has been operated to move a deposited stack of cards out of the zone of elevator operation.

Following the functional operation of the elevator device, a conveyor cam 258 becomes operative to rock a conveyor sector 260 (Fig. 4). The conveyor sector is mounted for rocking movement on the bearing shaft 248 and the same includes an arm which extends rearwardly to a point behind the cam shaft 190 and then forwardly and upwardly, where its upper free end carries a conveyor cam follower 262. An intermediate portion of the conveyor sector is provided with a second cam follower 264. The conveyor cam 258 is adapted to rock the conveyor sector 260 about the shaft 248 to intermittently operate a conveyor or off-take mechanism (Fig. 4), which is now to be described.

Supported from the machine base is a conveyor frame 266, on which is supported a pair of conveyor sills 268, on opposite ends of which are mounted pulleys 270 for operatively supporting the conveyor belts 256. The pulleys at the rear of the conveyor are mounted for rotation with a shaft 272. The shaft 272 has attached thereto a clutch device consisting of a clutch pinion 274 and a notched disc 276, both adapted for free rotation. A spring pressed clutch dog 278 is carried by the pulley 270 in operative relation to the notched clutch plate 276. The conveyor sills 268 support a plurality of spaced rollers 280, on which the conveyor belts 256 are adapted to rest. The conveyor belts 256 are of the endless kind, which are trained about the end pulleys 270 of the conveyor assembly.

It is evident that rotation of the clutch pinion 274 herein in a counterclockwise direction will operate to advance the conveyor belts 256, and in this respect it is noted that the clutch dog 278 operatively engages the notch in the plate 276 only in counterclockwise rotative movement. In other words, when the pinion 274 is rotated in a clockwise direction, the same rotates freely on the shaft 272 without operative effect on the conveyor pulleys. The conveyor sector 260 has a tooth segment 261, which is in driving contact with the clutch pinion 274. The relation of the conveyor cam 258 to the elevator cam 222 is such that the elevator is depressed and held in such depressed position prior to the operation of the conveyor. Upon depression of the elevator, the conveyor cam becomes effective to move a stack of cards out of the operative zone of the elevator platform 104, and it is only after the conveyor cam has completed its operative movement that the elevator cam permits the elevator to rise again to its upper position under the influence of the springs 230.

In the meanwhile, a shutter cam 282 (Figs. 4 and 8) is conditioned to rotate the shutter shaft 140 into a retracted clockwise direction upon return of the elevator to its card receiving position. The high point of the shutter cam 282 is adapted to bear against a cam roller 284, which is carried by a shutter lever 286, the same being pivoted on the bearing shaft 248. The upper end of the shutter lever 286 is joined to a shutter operating link 288, which in turn has a pivotal connection with the latch lever 148. Immediately after the elevator has returned to its card receiving position, the high points of the shutter cam 282 will ride in contact with the cam roller 284, thereby swinging the shutter lever 286 in a counterclockwise direction about the bearing shaft 248. This movement will serve to operate the shutter operating link 282 with consequent rocking of the shutter shaft and its attached latch lever 148. At the extreme of the shutter lever movement, the one end of the latch lever 148 will again engage behind the shutter latching structure 150 and the other end will release the clutch latch 202 (Fig. 3), permitting the same to return to clutch pawl engaging position. Upon the return of the clutch pawl 194 into contact with the pawl latch 208, the clutch mechanism of the shaft 190 is disabled and the whole mechanism is again reconditioned for a subsequent cycle of operation.

During operation of the mechanism, the cards are discharged to the platform 104 of the card elevator, and in the process of passing from the printing station the cards are counted by the number wheels 48, these wheels being driven through the constantly operating shaft 22, the rock plate 24, the lever 66, the operating bar 60, and the yoke 52. Normal transfer of values between orders represented by the wheels takes place in a conventional manner. The wheels 48 of the counter assembly continue to register the cards being discharged to the elevator platform so long as the operating bar 60 is permitted to hang substantially vertically and thereby establish contact between the lever 70 and the shoulder 78 of the bar. This position of the operating bar is normal and maintains so long as cards are passing through the printing station in normal step-by-step order. However, upon failure of normal card passage, the lever 36, which is controlled ultimately by the card sensing mechanism hereinabove referred to, will then be permitted to drop under the influence of the spring 40 and through the intervening linkage, the operating bar 60 will be tilted out of its vertical alignment and the shoulder 78 thereof will be withdrawn from the operating zone of its associated actuating lever, with the result that the number wheel advancing mechanism is disabled.

The number of cards to be deposited on the elevator 104 is determined by prepositioning a radially extending pin in the face of any one of the number wheels. As the radially extending pin rotates, it eventually comes in contact with the release lever 160 (Fig. 5), which is effective to rock the latch release lever 166, thereby releasing the spring biased shutter 138, which then springs into overlying position with respect to the cards on the card receiving elevator. Further discharge of cards from the printing station will be received by the shutter until the elevator mechanism has performed its intended function and has again returned to its elevated card receiving position.

The release of the shutter 138, which is horizontally positioned at the upper end of the shutter shaft 140, is also effective to render operative the cam shaft 190 by releasing the one revolution clutch device associated therewith. The downturned cam flange 214 on the rearwardly extending arm 212 at the lower end of the shutter shaft 140 is adapted to contact and swing the upturned part 216 formed at the free end of the clutch latch 202. When the clutch latch 202 is rocked about its pivot shaft 204, the pawl 194 carried by the cam plate 198 is permitted to drop into contact with the teeth of the clutch 192, thereby operatively connecting the cam shaft 190 with its source of power and thereby rotating the elevator cam 222, the conveyor cam 258 and the shutter cam 282. The elevator cam 222 is first effective to lower the elevator platform 104 through the instrumentality of the elevator cam arm 240, the elevator platform 104 being lowered to a point below the flights of the endless conveyor belts 256, thereby depositing the cards on the conveyor belts. The elevator cam 222 is so shaped as to hold the elevator platform in depressed position until the conveyor cam 258 operates to advance the conveyor belts 256. This latter function follows when the conveyor sector 260 is rotated in contact with the one-way clutch device 274, which is carried on the forward conveyor shaft 272. After the cards have been moved out of the operative zone of the elevator, the elevator cam 222 again releases the elevator, whereupon it again rises to its card receiving position. As the elevator approaches its upper limit of movement, the shutter cam 282 will retract the shutter 138, depositing any cards on the shutter upon the elevator platform. The shutter is retracted against the tension of the spring through the shutter lever 286 and the shutter operating link 288, which move the shutter latch lever 48, and particularly its twisted end 154, into contact with the latch 150, whereby the latch lever 148 is held in retracted position pending a subsequent operation of the device.

Driving power is imparted to the mechanism through a main drive shaft 290 which terminates beyond a frame bearing bracket 292, and on the end of the drive shaft 290 is a bevel gear 294, which lies in driving contact with a bevel gear 296 attached to the cam shaft 20. The cam shaft 20 carries a gear 298 from which power is derived for driving both the printing mechanism and the card counting, stacking and conveying mechanism. The train of gears through which power is transmitted is best shown in Fig. 1 of the drawings, wherein it is seen that the cam shaft gear 298 is in contact with the first gear 300 of a reduction train 302. The details of the reduction train are shown in the aforementioned Fred M. Carroll application, and since the train has no particular bearing on the operation of the card counting, stacking and conveying mechanism of this application, the details thereof need not be set forth here.

The last gear of the reduction train 302 drives a gear 304 which is fixed to the rear cam shaft 190, thereby transmitting operative power to the mechanism included in the card counting, stacking and conveying apparatus. The gear 304 also drives a gear 306 which is in contact with and drives the gear 44 of a lower feed roller shaft 308 of the rear pair (Fig. 3). The gear 44 in turn is in contact with the gear 46 which is affixed to the upper feed roller 310 of the rear pair of feed rollers. In the train of gears 302 is a long gear 312 adapted to drive a gear 314 which is attached to the drive shaft of the printing mechanism. Thus it will appear that the counting function of the counting wheels is controlled through the cam rod 22 while the power required for operating the printing unit 12 and the card stacking and conveying mechanism at the rear of the card printing unit is obtained through the rotary main drive shaft 290.

A single operative embodiment of the machine has been shown herein for the purpose of teaching the invention. It is, however, contemplated that changes may be made in the specific structure for carrying forward the invention which is defined in the following claims.

What is claimed is:

1. In a record card processing machine, a card processing station, a card receiving elevator located adjacent said station, means for delivering cards from said station to said elevator, a rotatable device for counting and registering cards delivered from said station, a card shutter, means for biasing said card shutter into a plane overlying said elevator to receive delivery of said cards from said processing station, means for latching said shutter against the influence of said biasing means, settable means carried by said card counter and register and rotatable therewith for effecting release of said shutter into card receiving position upon delivery to said elevator of a number of cards predetermined by the setting of said settable means, and means under control of said shutter releasing means thereafter effective to retract said elevator.

2. In a record card processing machine, a card processing station, a card receiving elevator located adjacent said station, means for delivering cards from said station to said elevator, a rotatable device for counting and registering cards delivered from said station, a card shutter, means for biasing said shutter into a plane overlying said elevator to receive delivery of cards from said processing station, means for latching said shutter against the influence of said biasing means, settable means carried by said card counting and registering device and rotatable therewith for releasing said shutter into card receiving position upon delivery to said elevator of a number of cards predetermined by the setting of said settable means, means under control of said shutter releasing means thereafter effective to retract said elevator and a cam device under control of said shutter releasing means operative to restore said shutter to its latched position and said elevator to card receiving position.

3. In a card processing machine, a card processing station, an endless card conveyor, a card elevator located adjacent said station and mounted for movement between said station and said conveyor, means for delivering cards from said station to said elevator, a card shutter, means for biasing said shutter into a plane overlying said elevator to receive delivery of cards from said processing station, means for latching said shutter against the influence of said biasing means, a device for counting and registering cards delivered from said station, settable means carried by said card counting and registering device operative upon said shutter latching means for releasing said shutter into card receiving position upon delivery to said elevator of a number of cards predetermined by the setting of said settable means, means rendered effective by the release of said shutter latching means for depressing said elevator into the operative orbit of said conveyor and thereafter advancing said conveyor to move the cards from said elevator, and means rendered operative by the release of said shutter latching means to restore said elevator to card receiving position and rotate said shutter out of said card receiving position.

FRED M. CARROLL.

References Cited in the file of this patent

UNITED STATES PATENTS

| Number | Name | Date |
|---|---|---|
| 1,412,795 | Pfohl | Apr. 11, 1922 |
| 1,569,033 | Reichel | Jan. 12, 1926 |
| 1,985,211 | McBean | Dec. 18, 1934 |
| 2,049,022 | Reininger | July 28, 1936 |
| 2,069,397 | Von Barth | Feb. 2, 1937 |
| 2,375,241 | Lindgren | May 8, 1945 |
| 2,414,059 | Powers | Jan. 7, 1947 |